(12) United States Patent
Frenken

(10) Patent No.: US 11,548,128 B2
(45) Date of Patent: Jan. 10, 2023

(54) METHOD FOR OPERATING A WORKING DEVICE, AND WORKING DEVICE

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 229 days.

(21) Appl. No.: 16/073,037

(22) PCT Filed: Jan. 6, 2017

(86) PCT No.: PCT/EP2017/050261
§ 371 (c)(1),
(2) Date: Jul. 26, 2018

(87) PCT Pub. No.: WO2017/129385
PCT Pub. Date: Aug. 3, 2017

(65) Prior Publication Data
US 2019/0030698 A1   Jan. 31, 2019

(30) Foreign Application Priority Data

Jan. 28, 2016 (DE) ...................... 10 2016 101 540.7
Sep. 14, 2016 (DE) ...................... 10 2016 117 313.4

(51) Int. Cl.
*B25B 27/02* (2006.01)
*B25F 5/00* (2006.01)
(Continued)

(52) U.S. Cl.
CPC .......... *B25B 27/026* (2013.01); *B23D 29/002* (2013.01); *B25B 27/10* (2013.01); *B25F 5/005* (2013.01); *B30B 15/16* (2013.01)

(58) Field of Classification Search
CPC ....... B25F 5/005; B25B 27/10; B25B 27/146; B23D 29/002
See application file for complete search history.

(56) References Cited

U.S. PATENT DOCUMENTS 8,056,473 B2   11/2011   Frenken
10,646,987 B2 *   5/2020   Barezzani ............... B25B 27/10
(Continued)

FOREIGN PATENT DOCUMENTS

DE   102008024018   11/2008
DE   102011011742   8/2012
(Continued)

OTHER PUBLICATIONS

International Search Report for corresponding international patent application No. PCT/EP2017/050261 dated Mar. 30, 2017, 5 pages.
(Continued)

*Primary Examiner* — Tyrone V Hall, Jr.
*Assistant Examiner* — Makena S Markman
(74) *Attorney, Agent, or Firm* — Klintworth & Rozenblat IP LLP

(57) ABSTRACT

A device and method for operating a motor-actuated working device is provided. A certain working operation requires a rise in an applied force to a certain working force. The device enables a rise in the force to a general working force that exceeds the certain working force and an apparatus is provided for monitoring the device value. For the certain working operation, an evaluation is performed to detect the characteristic change and that the attainment of the characteristic change is used as a signal for ending the certain working operation after the certain working force has been attained but before the general working force has been attained.

6 Claims, 17 Drawing Sheets

(51) Int. Cl.
  *B25B 27/10* (2006.01)
  *B23D 29/00* (2006.01)
  *B30B 15/16* (2006.01)

(56) References Cited

U.S. PATENT DOCUMENTS

| | | | |
|---|---|---|---|
| 10,710,223 B2 * | 7/2020 | Rosani | H02G 1/005 |
| 2003/0230131 A1 * | 12/2003 | Bowles | B25B 27/10 72/416 |
| 2010/0300308 A1 | 12/2010 | Frenken | |
| 2013/0328513 A1 | 12/2013 | Odenthal et al. | |
| 2016/0363510 A1 * | 12/2016 | Kanack | G01M 99/008 |
| 2017/0087709 A1 * | 3/2017 | Barezzani | B21D 39/048 |
| 2020/0001446 A1 * | 1/2020 | Ballard | B25F 5/005 |

FOREIGN PATENT DOCUMENTS

| | | |
|---|---|---|
| DE | 102015102806 A1 | 9/2016 |
| WO | 2008/138987 | 11/2008 |
| WO | 2016/005838 | 1/2016 |

OTHER PUBLICATIONS

Written Opinion for corresponding international patent application No. PCT/EP2017/050261 dated Mar. 30, 2017, 5 pages.
Machine translation for DE102008024018A1.
Machine translation for DE102011011742A1.
Machine translation for DE 102015102806A1.

* cited by examiner

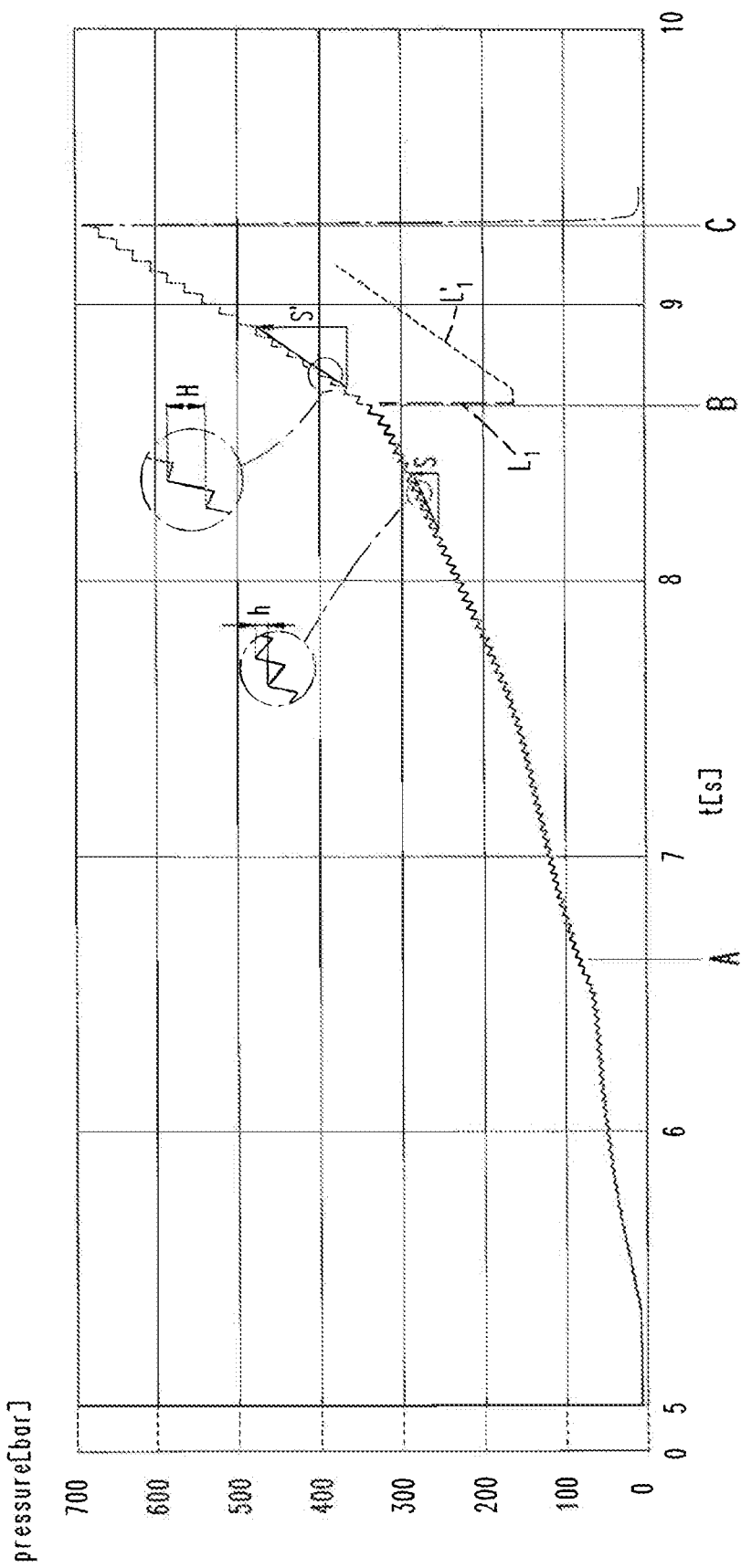

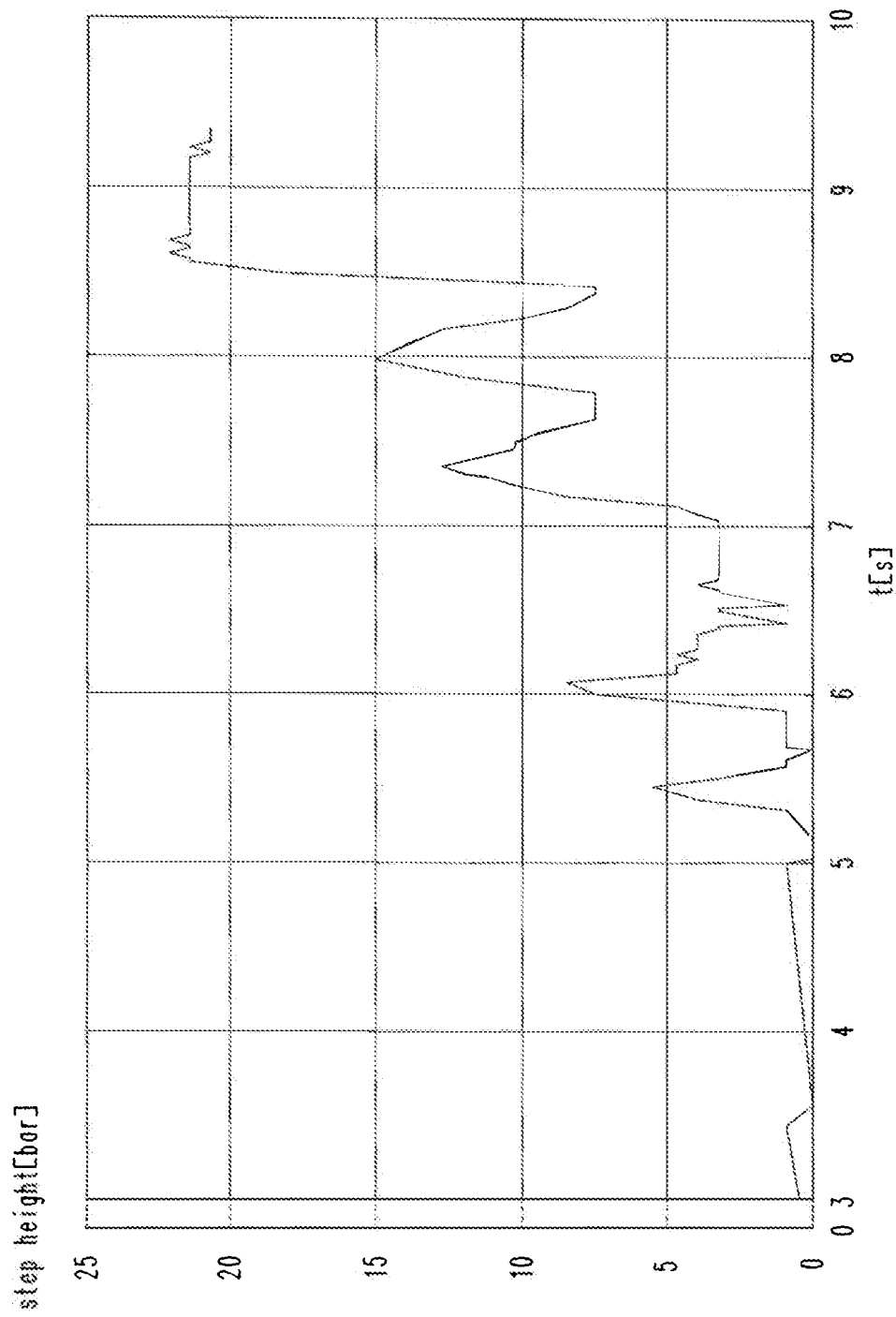

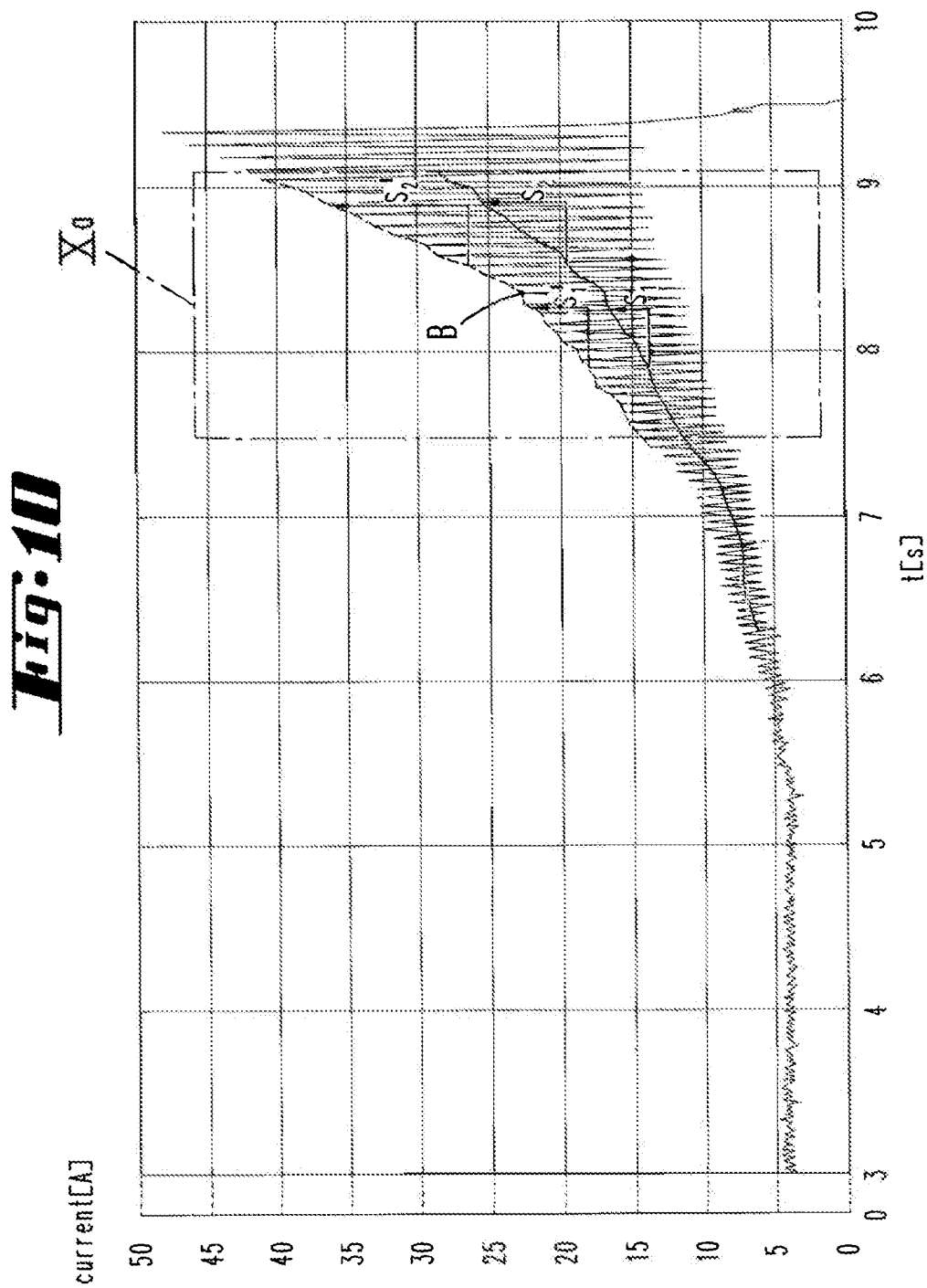

METHOD FOR OPERATING A WORKING DEVICE, AND WORKING DEVICE

FIELD OF TECHNOLOGY

The invention initially relates to a method for operating a motor-actuated working device, wherein a certain working operation requires a rise of an applied force to a certain working force, following the attainment of which the said working operation no longer requires a higher force and a characteristic change in a device value such as a motor current or a pressure rise in a hydraulic medium utilised for applying the force results, wherein furthermore, the working device makes possible a rise of the force to a general working force exceeding the certain working force and an apparatus for monitoring the device value is provided.

The invention, furthermore, relates to a motor-actuatable working device, in which a certain working operation requires a rise of an applied force to a certain working force and following the attainment of which the determined working operation no longer requires a higher force, and in which, furthermore, after the attainment of the certain working force a characteristic change in a device value such as a motor current or a pressure rise in a hydraulic medium utilised for applying the force results, wherein furthermore the working device makes possible an rise of the force to a general working force exceeding the certain working force and an apparatus for monitoring the device value is provided.

PRIOR ART

Such methods and working devices are known for example from WO 2008/138987 A2 (U.S. Pat. No. 8,056,473). In the known method, the hydraulic pressure resulting in the example of a hydraulically actuated working device when performing a certain working operation is measured and the attainment of a predetermined pressure in the hydraulic medium utilised as signal for terminating a working operation. Accordingly, a termination results during every working operation at the same predetermined pressure in the hydraulic medium. Accordingly, the same force is always applied also for example to the working jaws of such a working device. The same procedure can also be applied in terms of a motor current. When the motor current exceeds a certain absolute value, this dimension can be assumed to indicate that a predetermined, i.e. the general working force has been attained and a working operation is accordingly terminated.

The known method and the known working device each require the predetermination of the pressure to be attained or the force to be attained, irrespective of the certain working force that is required during a certain working operation.

SUMMARY OF THE INVENTION

Starting out from the prior art presented, the invention deals with the setting of objectives of stating a method for operating a motor-actuated working device or state a motor-actuatable working device, which makes possible utilising the fact that during a certain working operation only the attainment of a certain working force is required.

In an embodiment, the method for operating a motor-actuated working device, wherein a certain working operation requires a rise of an applied force to a certain working force, after the attainment of which the certain working operation no longer requires a higher force and a characteristic change in a device value such as a motor current or a pressure rise in a hydraulic medium utilised for applying the force results, wherein furthermore the working device makes possible a rise of the force to a general working force exceeding the certain working force and an apparatus for monitoring the device value is provided, is characterized in that during the certain working operation an evaluation with regard to a detection of the characteristic change is carried out and in that the attainment of the characteristic change is utilised as signal for terminating the certain working operation after the attainment of the certain working force, but before the attainment of the general working force, and in that a single or a multiple attainment of the general working force triggers a notification for a user and/or triggers a switching-off of the working device. The focus is that during the certain working operation an evaluation with regard to a detection of the characteristic change is performed and that the attainment of the characteristic change is utilised as signal for terminating the certain working operation.

In an embodiment, the method for the operation of a motor-actuated working device, wherein a certain working operation requires a rise of an applied force to a certain working force, after the attainment of which the certain working operation no longer requires a higher force and a characteristic change in a device value such as a motor current or a pressure rise in a hydraulic medium utilised for applying the force results, wherein furthermore the working device makes possible a rise of the force to a general working force exceeding the certain working force and an apparatus for monitoring the device value is provided, is characterized in that during the certain working operation an evaluation with regard to a detection of the characteristic change is carried out and in that the attainment of the characteristic change is utilised as signal for terminating the certain working operation after the attainment of the certain working force but before the attainment of the general working force, wherein, furthermore, as device value an individual pressure step of a certain amount is utilised for terminating the working operation. The focus is that during the certain working operation an evaluation with regard to a detection of the characteristic change on attaining the certain working force can be performed and that the detection of the characteristic change can be utilised as signal for terminating the certain working operation.

According to the invention it has been realised that after the attainment of the certain working force, but generally before the attainment the general working force and irrespective of whether or not the general working force has been attained or not, a characteristic change in one or more device values of the working device results and this characteristic change can be utilised for an individual termination of the working operation without any loss having to be accepted in terms of the quality of the working operation, i.e. of the undesirable completion of the working operation. According to the invention, a change of the device value and not an absolute device value is utilised for triggering a termination of the certain working operation.

During a multiplicity of working operations, a multiplicity of different pressures or forces can also result, during which the respective (certain) working operation is terminated. In the extreme, every working operation can be terminated at a different pressure or a different force.

Compared with a termination of a working operation on attaining a predetermined pressure value in a hydraulic medium, if a hydraulic medium is utilised for applying the working force, the advantage can also result that in a case, in which on an attainment of the predetermined pressure value the certain working force has not yet been attained, this working operation is also concluded without any loss of quality of the working operation. The same applies when for example the amount of a motor current of an electric motor is utilised. Since preferably, within the scope of the invention, no device value is checked any longer as to whether a general working force (or a general pressure) is attained during a certain working operation, and consequently no checking of a predetermined pressure value is needed either, a termination of a certain working operation cannot then materialise either, without the working operation having also been terminated in terms of quality. This obviously applies with the exception that nevertheless a monitoring in terms of a maximum permissible pressure or a maximum permissible working force is carried out and the overshooting of which for protecting the working device results in the termination of the working operation.

The working operation can for example be a crimping. In particular a crimping using a hydraulic crimping device. Here, two crimping jaws are usually moved relative to one another, between which crimping jaws a part to be crimped or a combination of parts to be crimped is inserted. For as long as the part or the parts are elastically and/or plastically deformed by moving the working jaws together, a—first—rise of the working force results. When the jaws have been moved together a further rise of the working force practically results only in a "bottoming out" of the working jaws. Thus, substantially only the device characteristic itself, i.e. for example only the elasticity or stiffness inherent in the two jaws is then substantially effective against the further rise of the working force. With respective to this further rise, a changed—second—rise of the working force results. The transition from the first rise to the second rise of the working force results in the characteristic change in a device value.

For example, the characteristic change during the measurement of the pressure rise in a hydraulic medium utilised for generating the working force can consist in a greater rise of the pressure rise curve. In particular when for generating the pressure in the hydraulic medium a piston pump is used, the pressure rise curve in the case of a high resolution is composed of a series of step-like part regions which in the following are also referred to as steps and different steps result with the rise of the pressure in the hydraulic medium. On attaining the certain working force, when no substantial absorption of the additional working force, i.e. in the part to be crimped or the parts to be crimped takes place any longer, the steps become significantly larger (higher). Something comparable can also be noticed in the case of the motor current of an electric motor, when the electric motor is indirectly or directly utilised for generating the working force. An example of an indirect utilisation is an electric motor as drive of the pump required for the force generation in a hydraulic medium. A direct utilisation can result for example when with the electric motor for example a crimping jaw is moved via a mechanical transmission being mechanically coupled to the motor shaft.

The working operation can also consist in a cutting. Here, the effect that on attaining the certain working force, when the severing of a work piece occurs, the pressure in the hydraulic medium drops again or initially the motor current of the electric motor drops, can initially result. A further moving of the shear parts however in such a working device also results in a "bottoming out", during which no relevant movement of the shear parts relative to one another occurs any longer, but an increasing force is directly absorbed in a device part itself, in particular through elastic deformation. Here, a characteristic change of the device value in the sense that a greater rise of the working force upon continuation of the movement of the cutting edges does not materialise directly after completion of the severing operation, i.e. the factual termination of the certain working operation. Such a characteristic change however materialises also during such a cutting operation when the shear parts or a part loading a shear part is subjected to a "bottoming out". Often, this is practically not the case time-wise or practically not substantially after the factual end of the certain working operation. Alternatively, a transition to a rapid drop of the working force, as results after completion following the severing in the case of a cutting operation, can also be utilised as characteristic change of a device value, or an analogous drop of the motor current. The hydraulic pressure or a motor current can also be utilised for example as device value for this purpose.

The same configuration also results when the working operation, as further possible, consist of a stamping.

The termination of the certain working operation preferably takes place with all described working operations immediately upon a detection of the characteristic change. In the case of the described pressure steps, the first detected step height, which exceeds a predetermined step height, can already lead to the termination of the working operation. However, a notification via two or more for example up to 5 or 10 pressure steps can also be carried out and the exceeding of such a mean value with regard to a predetermined mean value for such a number of pressure steps can then be utilised for the termination of the working operation. Thus, an unnecessary loading of the device with a higher working force than is required for completing the certain working operation does not practically occur or can be kept as low as possible. The same also applies with respect to the motor current when the same is detected for example with respect to the characteristic change. Insofar as the motor current is also a curve in steps, as mentioned, a practically similar evaluation as with the described pressure rise in the hydraulic medium can take place. When the motor current rises continuously, the gradient can be calculated via a curve detection and mathematical derivation and immediately, upon attainment of a predetermined gradient dimension, the termination of the certain working operation take place. However, the motor current can also be monitored with respect to the absolute rise with regard to preferably very short specified time intervals and the—preferably first—exceeding of a certain predetermined working value trigger the termination of the certain working operation.

The motor current can have a characteristic other than a pressure rise over the time. The motor current can, in particular in the case of a piston pump, pulsate very significantly, i.e. fluctuate very significantly as a function of the movement of a pump piston of the piston pump. It can have a maximum in terms of a pump movement of the pump piston during the pumping, i.e. the sliding-in of the pump piston in a pump cylinder and upon retraction of the pump piston, which practically constitutes a load-free movement, decrease very significantly. Here it can be advisable to determine a smoothed current profile and for example utilise the gradient of the same as device value. When the gradient exceeds a certain predetermined dimension, a termination of the working operation can also be brought about on the basis of such a motor current. During the determination of the gradient of such a curve it is necessary in principle to focus on a force-distance relationship (force-distance curve) and not on a force-time relationship (force-time curve). However it is possible in the case of a force-time curve to take into account the variable motor rotational speed by calculation and thus convert a time axis into a distance axis. The force need not be directly measured, it can also be calculated from a pressure.

With regard to an evaluation of the step height of a measured pressure in a hydraulic system, as also explained in more detail in the following, a force-distance information is practically obtained at the same time, since in particular when using a piston pump with every pump stroke, in this case a piston stroke of the piston pump, an always same quantity of hydraulic medium is delivered in first approximation and thus the hydraulic piston practically covers an almost same distance per stroke of the piston pump. The associated force for the distance of a stroke of the piston pump corresponds to the step height. This results in the dimension of the step height as direct dimension for a mechanical (and also hydraulic) stiffness of the crimping head and can thus be utilised as device value.

Since, as indicated further, the detection of the device values takes place at very short time intervals, and in this regard continuously, the time-wise termination of a certain working operation can thus take place within fractions of a second after the attainment of the certain working force. By way of this it is not least possible to also achieve a very effective time-wise utilisation of the working device. A detection of multiple device values can also be jointly utilised for evaluation with regard to a characteristic change. In the process, an "and" linkage but also an "or" linkage can be used as a base. In the case of an "or" linkage, the termination of the working operation takes place when one of the utilised device values exhibits the characteristic change. Accordingly, in the case of an "and" linkage, a termination of the working operation takes place only in particular when all utilised device values exhibit the characteristic change.

BRIEF DESCRIPTION OF THE DRAWINGS

In the following, the invention is explained furthermore by way of the attached drawing on which however only one exemplary embodiment is reflected. There it shows:

FIG. 9 a representation of the pressure rise in a hydraulic medium during the performance of a working operation;

FIG. 9a a representation of the absolute pressure values attained at pressure steps as a function of the time for example during a crimping according to FIG. 9;

FIG. 10 a representation of the motor current, plotted over the time of a piston pump of an electrohydraulic manual crimping tool;

DESCRIPTION OF THE EMBODIMENTS

Figure 1:
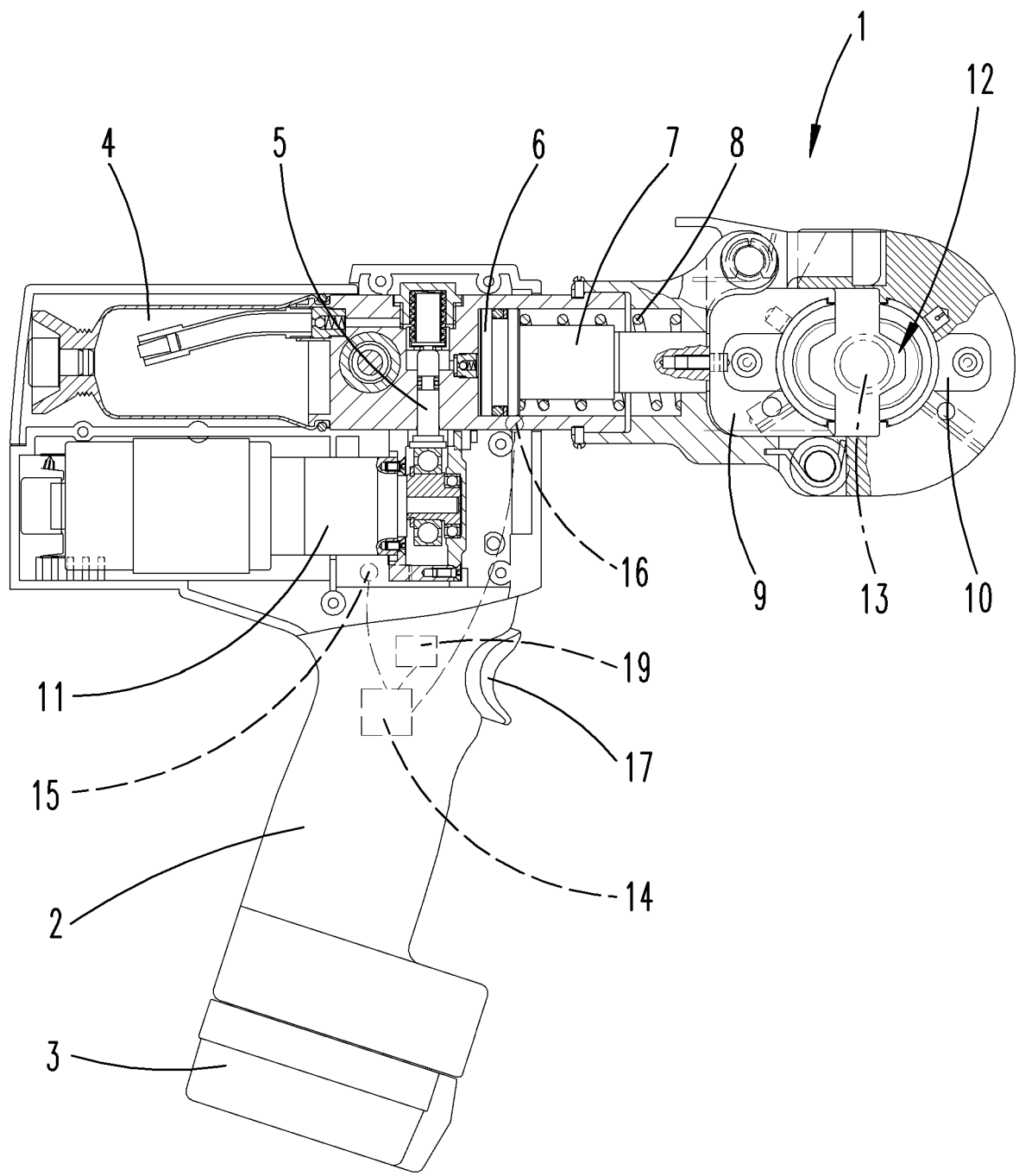
FIG. 1 a hydraulic manual crimping device, partly sectioned.
Figure 2:
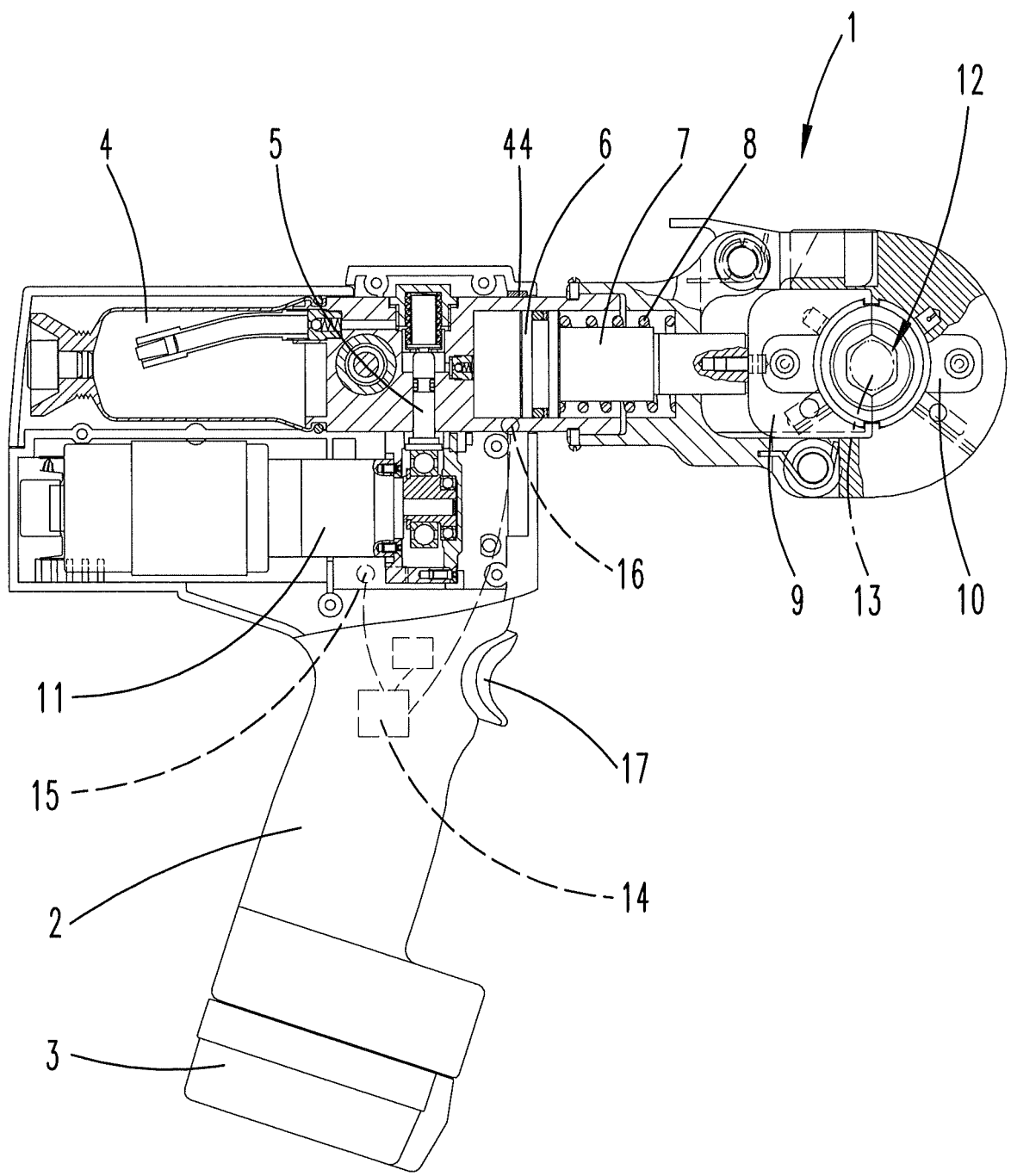
FIG. 2 the crimping device according to FIG. 1 on attaining the certain working force.

With respect to the FIGS. 1 and 2, a hydraulically actuated manual crimping tool 1 is initially shown. The hydraulically actuated manual crimping tool 1 can comprise a grip. Furthermore, an accumulator 3 if it is to be operated without cable. However, a connection to a supply via an electric network by means of an electrical cable is also possible.

The hydraulic manual crimping tool 1 can, furthermore, comprise a hydraulic tank 4. By means of a pump 5, for example a piston pump, hydraulic medium can be pumped out of the hydraulic tank 4 into a hydraulic cylinder 6. By pumping the hydraulic medium into the hydraulic cylinder 6, a hydraulic piston 7 in the hydraulic cylinder 6 can be moved between a starting position and an end position. The hydraulic piston 7 can be subjected to the action of a return spring 8.

Through the movement of the hydraulic piston 7, a moveable working jaw 9 in the exemplary embodiment can be shifted against a fixed working jaw 10. In a crimping chamber 12, a crimping blank 13 can be received. The crimping blank 13 can consist for example of a sleeve and a tube which are to be crimped together.

In the case of other hydraulic manual crimping devices, two moveable working jaws, for crimping, can also be pivoted against one another by for example the hydraulic piston 7.

The pump 5 can be driven by means of an electric motor 11, which can obtain its energy supply via the already mentioned accumulator 3 or for example also via the mentioned mains cable. Furthermore, a hydraulic manual crimping device according to FIG. 1, but also the further devices shown furthermore in the following, comprises a data processing device that is suitable for evaluating transmitted measurement values, which are schematically reproduced here by 14. Furthermore, such a device comprises a control device, which is only schematically indicated here by 19 and is line-connected with the data processing device 14. The functions of the data processing device 14 and of the control device 19 can also be produced by a standardized electronic component. By way of the control device, a termination of a working operation can be directly and device-autonomously carried out. For example in a configuration as described further down below with reference to the FIGS. 11 to 15.

Similarly, the hydraulic manual crimping device 1 can comprise a sensor 15 for detecting the motor current of the electric motor 11 and/or a sensor 16 for detecting a pressure in the hydraulic medium. Preferably, the pressure of the hydraulic medium in the hydraulic cylinder 6 is measured by the sensor 16.

The sensor 15 for the motor current and/or the sensor 16 for the hydraulic pressure supplies measurement values at very short time intervals in each case. The time intervals are in particular below one second, further preferably below a tenth of a second. Such a time interval can also amount to only one or more milliseconds.

In particular the sensors are electronic sensors which in turn are supplied with electric energy for example via the accumulator 3.

A termination of a working operation can consist in that working parts such as a jaw in the case of a crimping tool or a cutting edge in the case of a cutting tool or a stamping jaw in the case of a stamping tool are moved back into a starting position or such a return movement is initiated. In the case of a hydraulic crimping tool, the initiation can consist in particular in that a hydraulic piston is moved back subject to returning hydraulic medium out of a hydraulic cylinder into the storage tank. For this purpose, in particular the opening of a backflow valve is generally required. With respect to a special embodiment of such a hydraulic crimping device this is described in detail further down below by way of a possible exemplary embodiment making reference to the FIGS. 11 to 15.

When generally performing a crimping operation with the hydraulic manual crimping device 1, a crimping is triggered for example via a switch 17 to be manually actuated following the insertion of a blank 13 into the crimping chamber 12. The pump 5, which in the case of the exemplary embodiment is a piston pump, then commences pumping hydraulic medium out of the hydraulic tank 4 into the hydraulic cylinder 6 subject to performing a multiplicity of piston strokes.

As is evident from FIG. 9, in the case of which the pressure is plotted on the ordinate and the time on the abscissa, a certain rise of the pressure results, from which—but which in this case is not of further interest—the work piece contact at the point A by way of the crimping jaws can be recognised. The pressure continues rising, namely generally more strongly than before the work piece contact, up to a point B. At this point B the certain working force has been attained and no higher working force is actually required anymore.

A characteristic change in the gradient S or S' of the pressure curve materialises after the point B and additionally with respect to an individual step of the pressure value materialising, see magnifier representation in FIG. 9, a characteristic rise with respect to the step height H relative to a step height h prior to reaching the point B.

This characteristic value of the step height H is utilised in the exemplary embodiment in order to determine the attainment of the certain working force and utilise an attainment of the step height H as signal for terminating the certain working operation.

In a memory of the data processing device and/or of the control device, a certain device value can be stored which with regard to an actually detected device value is utilised for the comparison and the exceeding of which (or if applicable undershooting of which) is utilised as signal for terminating the certain working operation. The stored device value can be an absolute value such as for example the step height or a relative value, which for example with respect to an exceeding of a previous step height (or multiple averaged step heights) predetermines a percentage limit such as for example 10% or 20%.

The stored limit value can also be a value for the mentioned gradient so that the respective calculated gradient can be compared with the same.

Merely for illustration, the working operation has been carried on further in dashed representation in FIG. 9, here up to a point C, which represents an attainment of the general working force.

The step-like profile of the pressure curve in the exemplary embodiment is caused by the piston pump employed. During the running up of the piston, a higher pressure step is reached wherein during the return of the piston, this pressure is maintained or drops slightly until during a next running up of the piston the pressure is increased again. Such a piston pump usually operates with a frequency greater than 1 per second. Through the frequency in the detection of a device value corresponding at least to the frequency of the piston pump in this exemplary embodiment, i.e. for example of a hydraulic pressure value or a value regarding the amount of the motor current, the working of the pump can be detected in a very large resolution, thus in this case in a resolution which generates a single pressure step, which is generated by a piston movement of the piston pump. The measurement with regard to the absolute value of a pressure step or the height of a pressure step is performed in such a manner that the values are compared at a comparable point of time. Either for example at the start of a piston stroke or at the end of a (forward) piston stroke of the piston pump (if such a piston pump is used).

In FIG. 9a, a height of the pressure steps measured with an exemplary manual crimping device is plotted over the time. Evident at the end (in the region of 9 seconds) an absolute height of approximately 22 bar at one pressure step. The attainment of this predetermined absolute value (which, as still explained further down below can be characteristic for a certain manual crimping device) can then be utilised for terminating the working operation.

In FIG. 10, a characteristic of a motor current of a piston pump of an electrohydraulically operated manual crimping device is reproduced. Furthermore, an averaged current curve is drawn in by means of which the transition of a (preceding) gradient $S_1$ to a gradient $S_2$ utilised for terminating the working operation can be utilised as corresponding device value for terminating the working operation. Accordingly, the point B is at the transition between the characteristic gradients or at the transition to a characteristically high gradient.

This gradient can for example be also fixed for example by way of the maximum values of the current curve, see dashed lines and gradients $S_1'$ and $S_2'$.

Figure 10A:
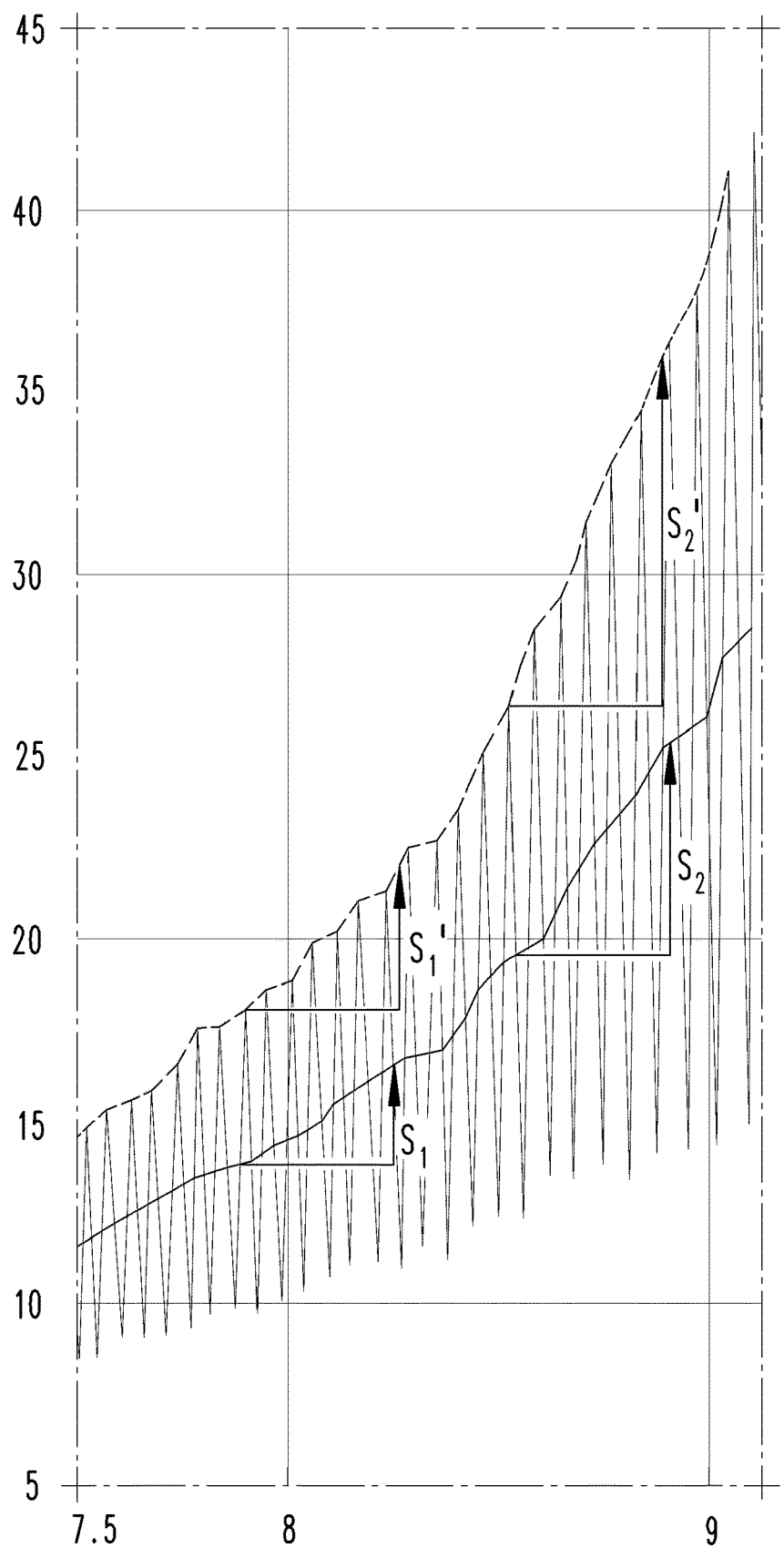
FIG. 10a an extracted enlargement of the region Xa from FIG. 10.

In FIG. 10a, the region Xa from FIG. 10 is reproduced enlarged. Evidently, a calculated line can be placed over the peaks and gradients $S_1'$ and $S_2'$ calculated for these. Averaging can also be performed via the current profile, see continuous line and by way of this the gradients $S_1$ or $S_2$ detected or calculated.

With regard to the pressure steps according to FIGS. 9, 9a it has also been shown that a high pressure step leading to a disconnection has a certain absolute value which is practically independent of the objects to be crimped, but should be considered as a constant of a certain device. In the case of a concrete hydraulically operated crimping device, this constant can be for example between 15 and 25 bar, specifically at 20 to 22 bar.

It has also transpired that this or any other absolute value corresponding to a device in this regard is only attained in particular when all components of the device such as non-return valves, electric drive etc. required for this purpose are in a proper state. When wear materialises, the mentioned height is no longer reached but a reliable crimping can nevertheless be still achieved since in this case the usual rise to the permitted maximum value of the pressure (to the general working force) takes place and a termination of the working operation by way of an attainment of the general working force can take place.

In a wider sense, this relationship can also be utilised for utilising a single or multiple attainment of the general working force for a message to the user to perform an inspection of the device. In addition to this, such single or multiple attainment of the general working force, wherein a certain number can be predetermined, for example between 3 and 10 cases, in particular when, which can be predetermined further, this number of cases occurs immediately one behind the other, to trigger a switching-off of the device, which thus forces the user to perform or have performed an inspection, if applicable a works inspection.

Figure 3:
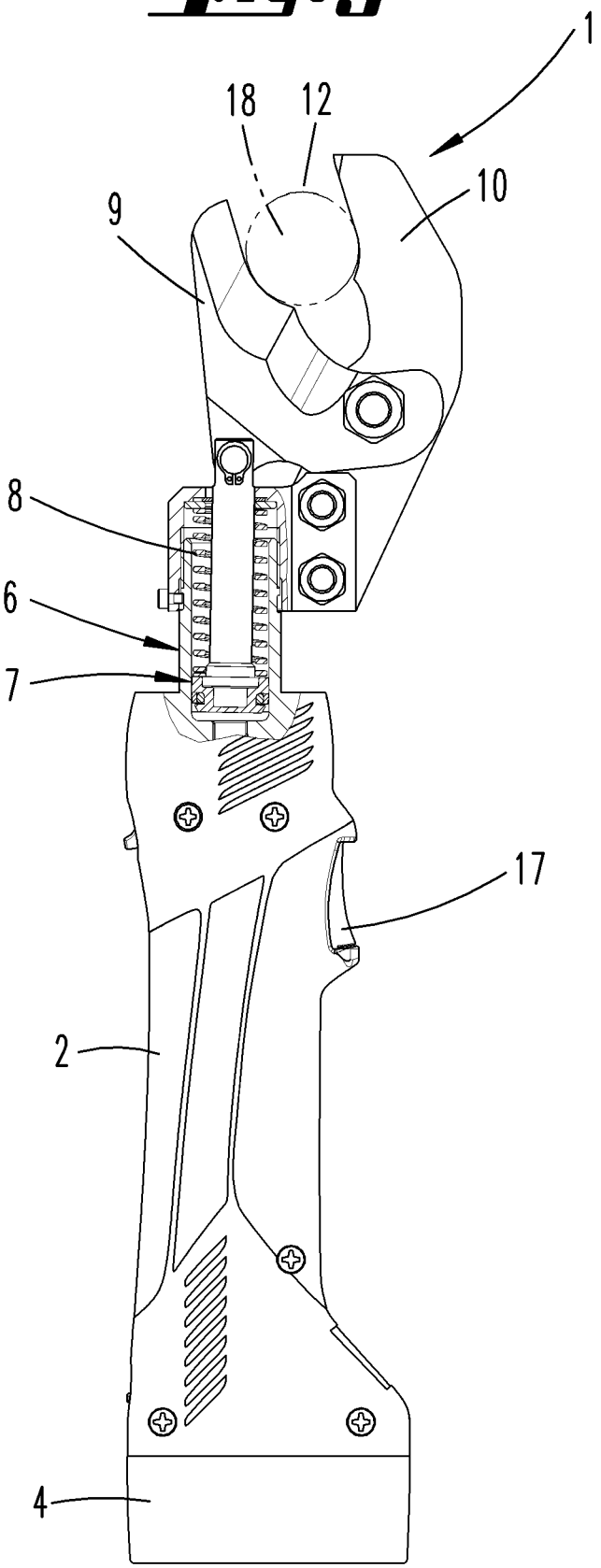
FIG. 3 a hydraulically actuated cutting device before the start of a working operation.
Figure 4:
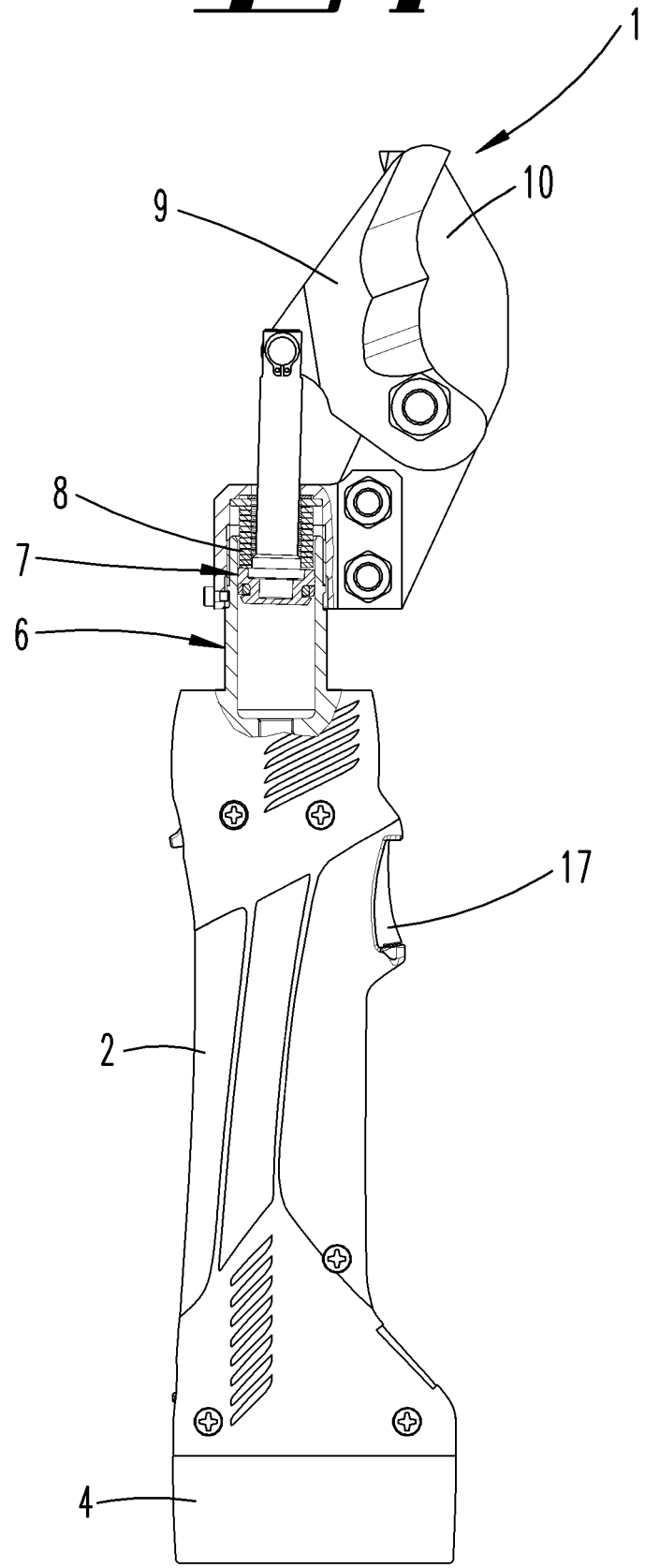
FIG. 4 a part region of the working device according to FIG. 3, after the attainment of the certain working force.

The exemplary embodiment of the FIGS. 3 and 4 shows in the same way the operations in the case of a cutting device. Here a blank 18, which is to be cut through, is shown in FIG. 3. In FIG. 4, the cutting operation is terminated.

Since after the cutting however a sudden drop in the working force occurs initially, this operation is reproduced in FIG. 9 by the dashed line $L_1$. Here, the rise in the region $L_1'$ after the drop results in that in the exemplary embodiment the hydraulic piston 7, because of the coils of the return spring 8 lying close to one another, cannot move any further and the pressure rise materialises by way of the "bottoming out" between the hydraulic piston and the hydraulic cylinder. Here, the characteristic rise in the step height, when a piston pump is used, or the characteristic change, namely with regard to a larger gradient of a pressure rise curve as such, can also be interpreted as signal for terminating the certain working operation.

Figure 5:
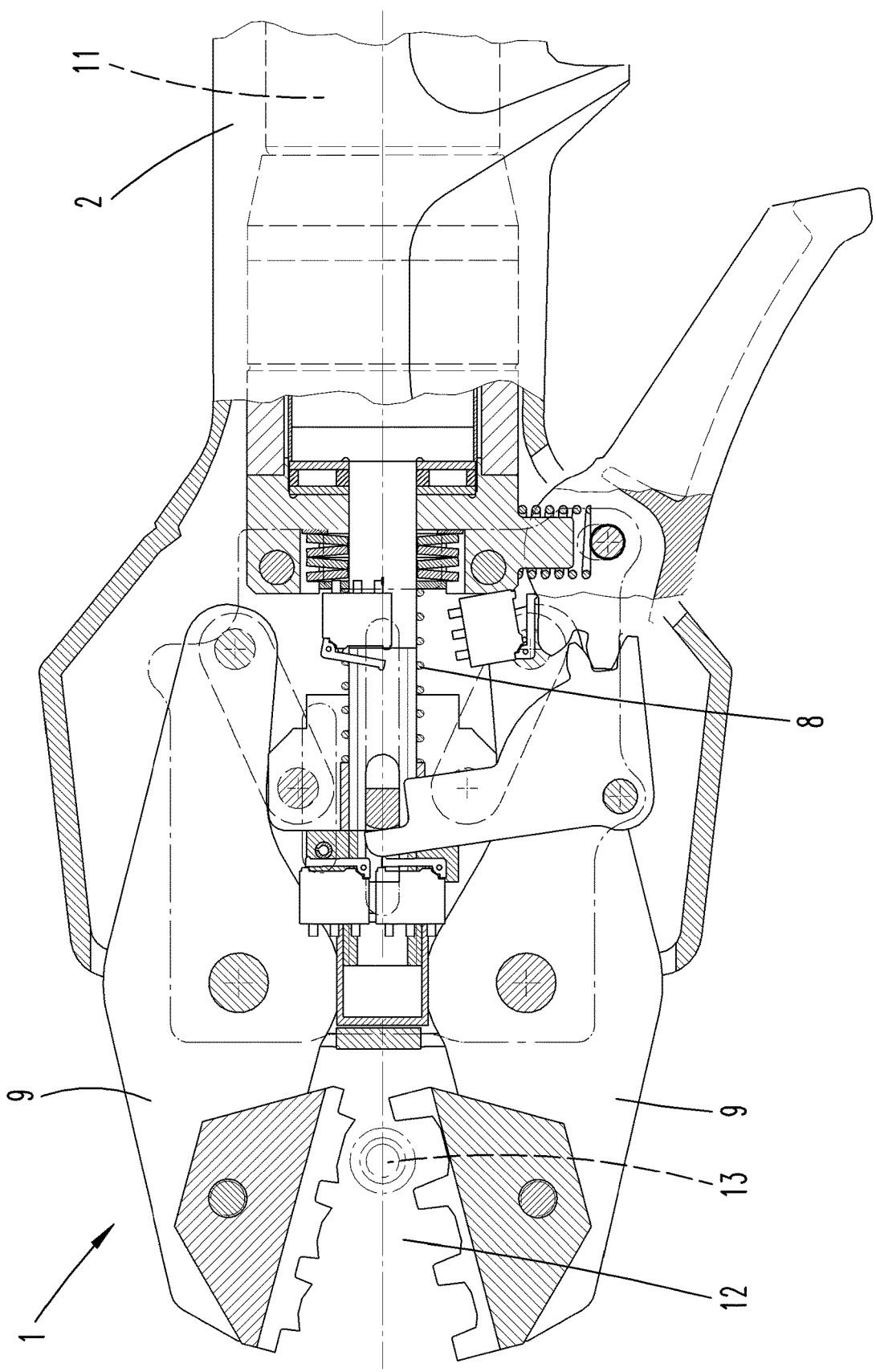
FIG. 5 an electric motor-actuated crimping tool prior to performing a certain working operation.
Figure 6:
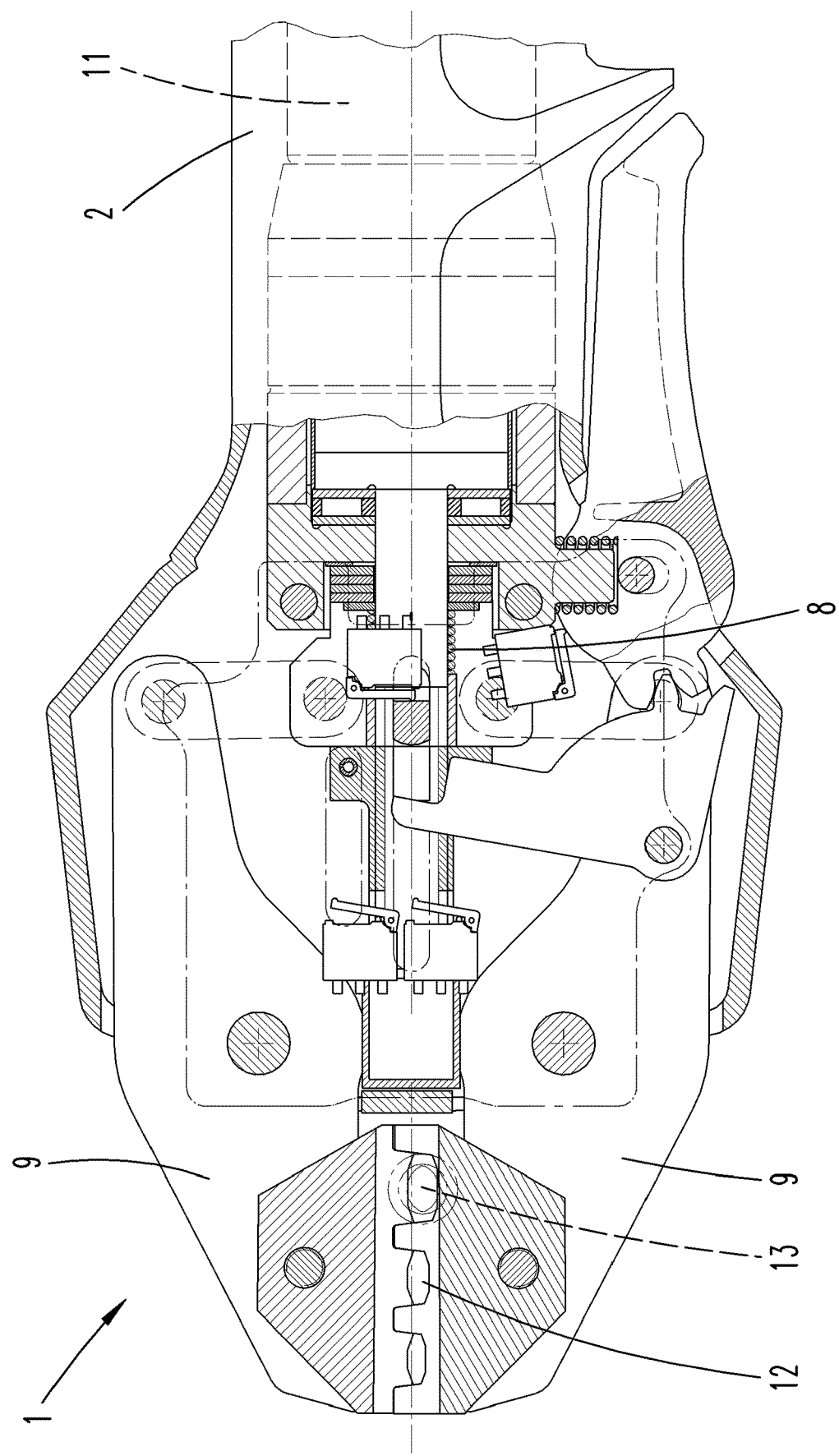
FIG. 6 the crimping tool according to FIG. 5 after the attainment the certain working force.
Figure 7:
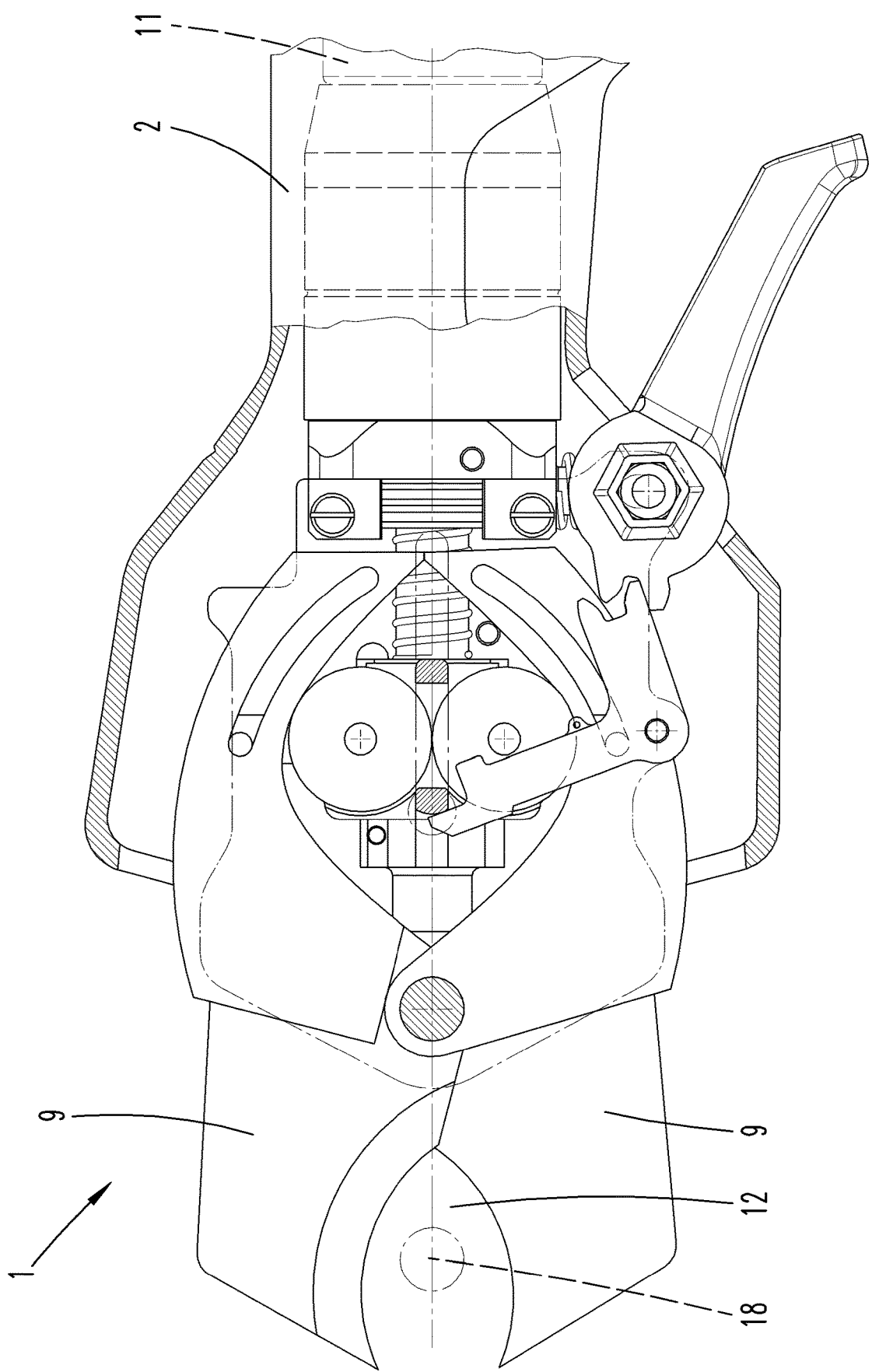
FIG. 7 an electric motor-actuated cutting device before the start of a working operation.
Figure 8:
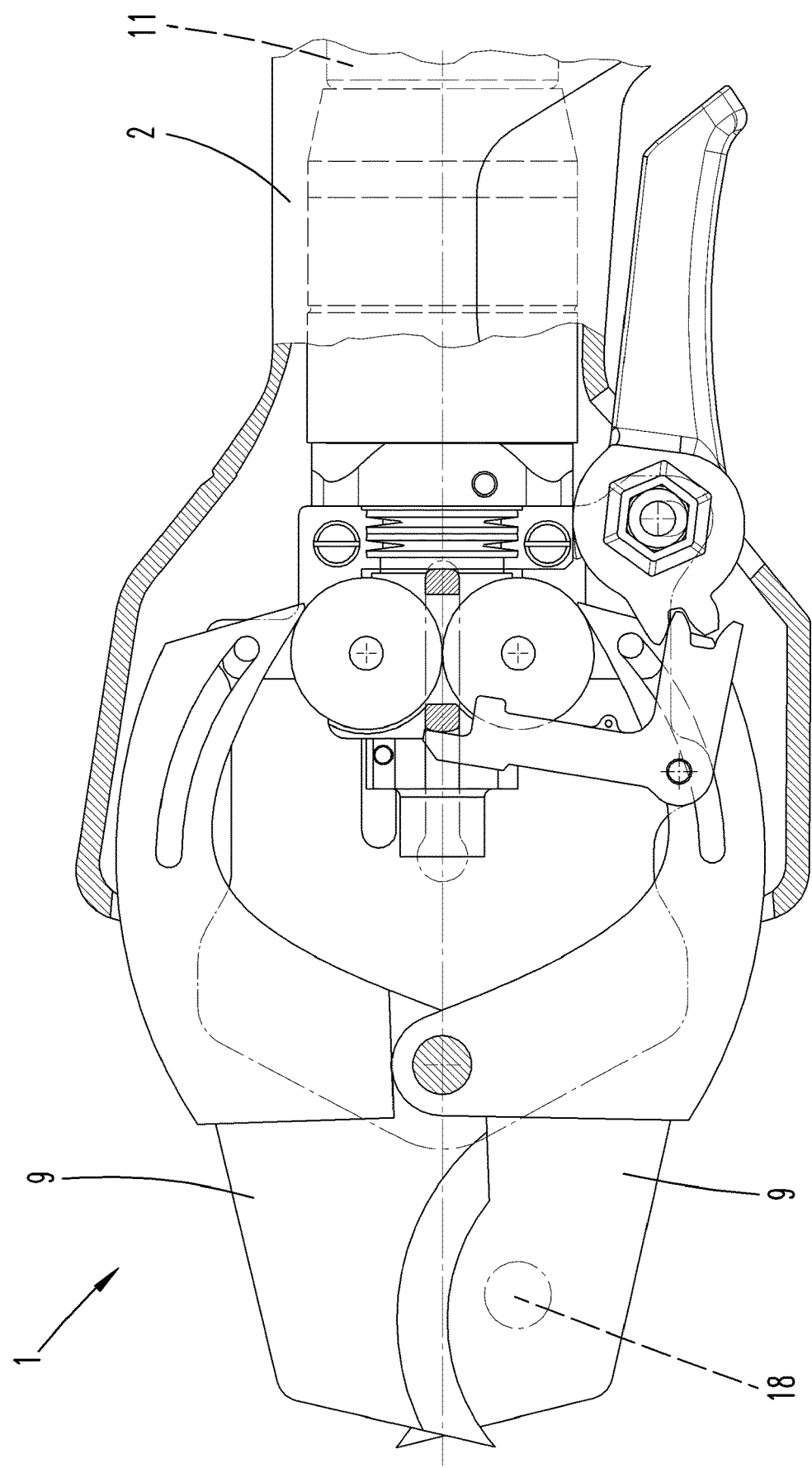
FIG. 8 the working device according to FIG. 7 after the attainment the certain working force.

In the exemplary embodiments of FIGS. 5 and 6 as well as 7 and 8, only one electric motor 11 is provided, which directly acts on a spindle and thus brings about a moving of the crimping jaws or cutting jaws. In this case, the evaluation of the motor current of the electric motor 11 is opportune for detecting a characteristic change of a device value. Alternatively or complementarily, a force, expansion or tension measured for example via a strain gauge 44 in a device part that is subject to a force during the course of a working operation can be utilised as device value the characteristic change of which is utilised for the evaluation.

The termination of the certain working operation in the case of a hydraulic generation of the working force is preferably initiated by the opening of a backflow valve. At the same time, the hydraulic pump is preferably switched on. As backflow valve, a solenoid-actuated backflow valve can be employed for example, such as described in DE 1020 102 806. The content of this application is hereby included in full in the disclosure of the present application also for the purpose of including features of the mentioned older application in claims of the present application.

In the case of a working device that is only electric motor-actuated, the termination of the certain working operation can be performed by stopping and also reverse rotating the electric motor 11 preferably also initiated immediately. By way of the reverse rotation, working means such as the mentioned working jaws or cutting jaws can be opened again.

With regard to the FIGS. 11 to 15, the actuation of a backflow valve for terminating a working operation or at any rate for initiating the termination in the case of a hydraulic crimping device is now described in more detail.

The hydraulic crimping device shown in the FIGS. 11 to 15 comprises, corresponding to the hydraulic crimping device shown in FIG. 1, an electric motor 11 which is not reproduced here in detail, a hydraulic medium storage space 4 and a pump 5.

Furthermore, the hydraulic crimping device of the FIGS. 11 to 15 comprises a hydraulic piston 7, which is moveable relative to the hydraulic cylinder 6 by hydraulic loading.

For carrying out a working operation, hydraulic medium is pumped into the hydraulic cylinder 6 with the pump 5. The hydraulic cylinder 6, furthermore, comprises a return line 20 via which the hydraulic medium can flow back into the hydraulic tank 4 via the backflow valve 21.

Figure 13:
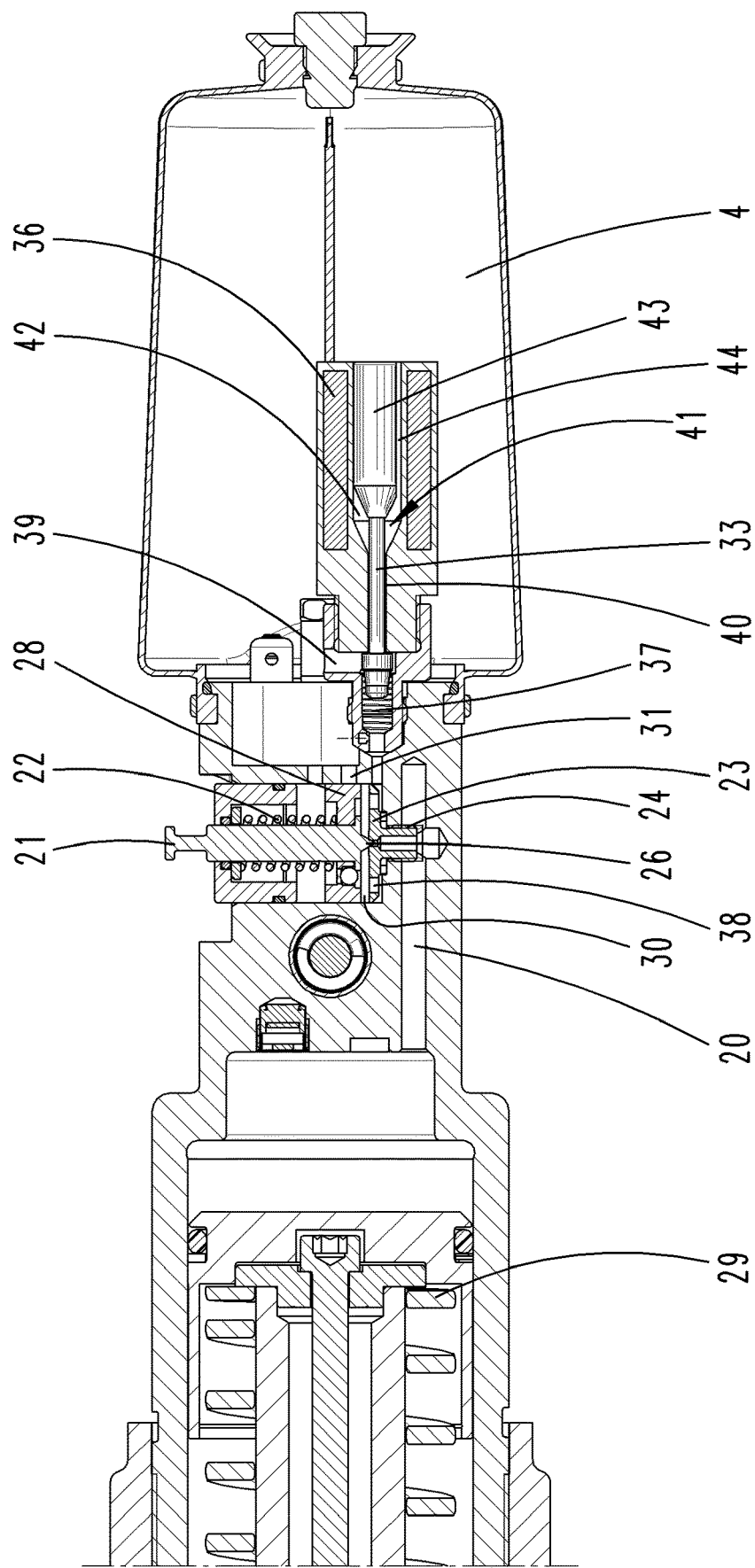
FIG. 13 a representation corresponding to FIG. 11, upon movement of a movement part of the manual crimping tool in a working position.
Figure 14:
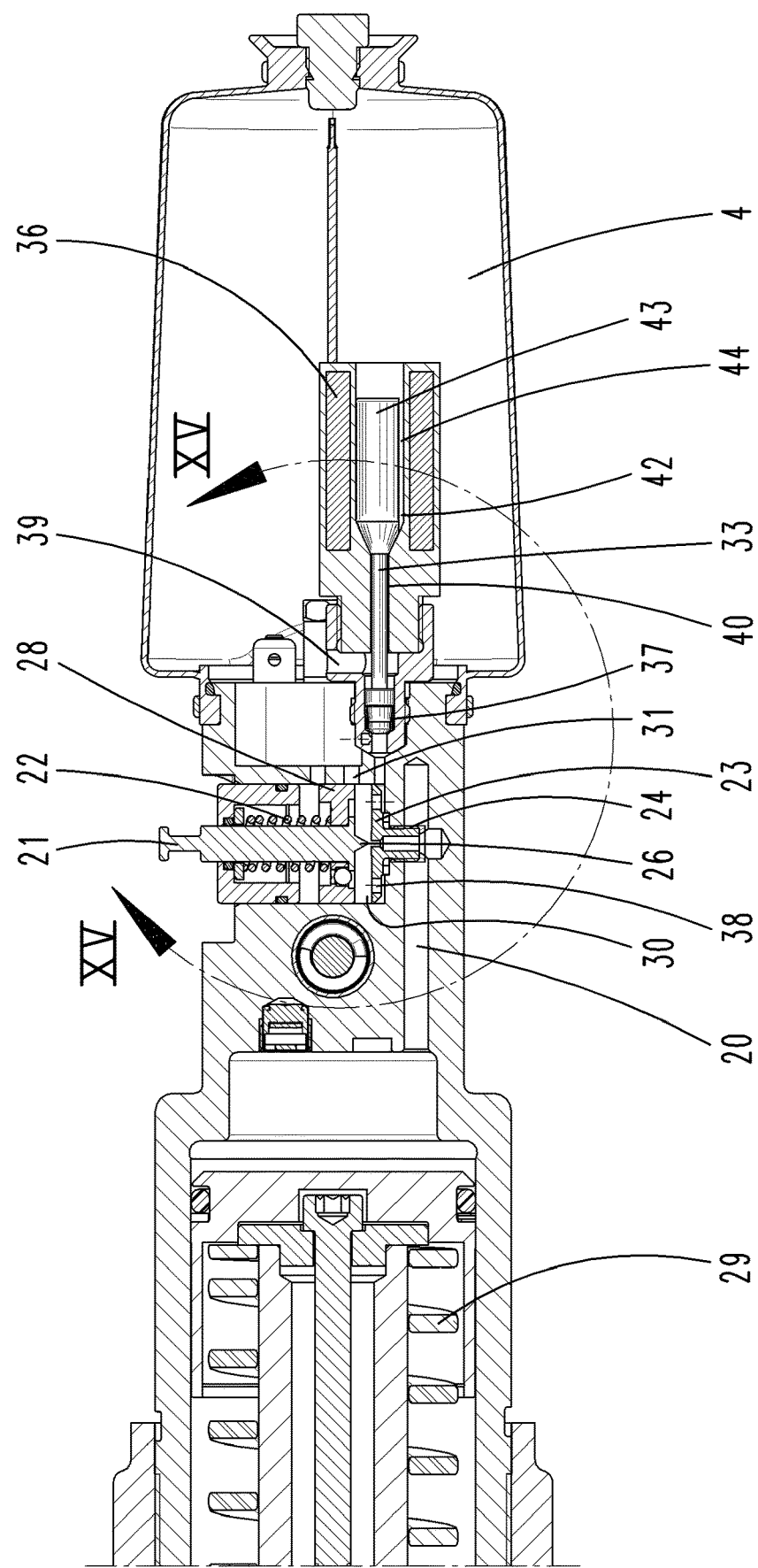
FIG. 14 a representation corresponding to FIG. 13, with opened backflow valve and actuated pressure booster piston and FIG. 15 the extracted enlargement of the region XV in FIG. 14.

As is evident in particular from the FIGS. 13 and 14, the volume in the hydraulic cylinder 6 changes with the working state of the hydraulic manual crimping device 1. In the representation according to FIG. 13, the hydraulic piston 7 is in a position that is changed relative to FIG. 11. Following an opening of the backflow valve 21 (FIG. 14), which corresponds to a termination of the certain working operation or the initiation of the same, the hydraulic piston 7 moves back in the direction of its starting position according to FIG. 11.

The electric motor 11 for operating the pump 5 and thus for moving the hydraulic piston 7 in the direction of a working position is activated via a switch 17 which is preferably designed as a manually actuated push button. The electricity supply of the electric motor 11, as additionally preferred also of the already mentioned switching/control electronics and if applicable further electric or electronic components of the device, is effected by way of a device-side accumulator which is not shown in the FIGS. 11 to 15 or via an electric line for a mains connection.

In the valve closure position, the backflow valve 21 is pushed into the valve seat by means of a pressure spring 22. In detail, the valve seat preferably consists on a screw-in part 23, which is screwed into the housing of the hydraulic manual crimping device 1 via a thread 24.

A through-flow bore 25 is provided in the valve seat, if appropriate in the screw-in part 23. The same is in connection with the return line 20 in terms of flow.

Because of the narrow cross section of the flow-through bore 25 in the valve seat in connection with the preload exerted by the pressure spring 22, the backflow valve 21 only opens in principle when a certain triggering pressure is exceeded. This is a pressure for example of 600 or 700 bar. This triggering pressure corresponds to the attainment of the general working force.

Once the backflow valve 21 has opened, the pressure of the hydraulic medium is no longer only present on the surface corresponding to the cross-sectional area of the through-flow bore 25, a part-piston surface, for example provided by a valve needle 26, but also on the entire surface facing the hydraulic space (in particular hydraulic cylinder 6), the sub-surface 27 of the backflow valve piston 28 of the backflow valve 21 comprising the valve needle 26. For this reason, the opened backflow valve 21 is already held in the open position by a very low pressure in the return line 20, for example a pressure of 2 to 5 bar.

The valve needle 26 need not be formed ideally terminating in a point. Preferentially, it is formed conically at any rate.

This low pressure is preferably generated during the return of the hydraulic piston 7 by a spring 29 which acts on the hydraulic piston 7 and loads the hydraulic piston 7 into the end position.

In a drain flow direction after the through-flow bore 25, the pressure is again significantly lower. For example, the pressure, in particular at the start of the return of the hydraulic piston, only amounts to ¾ or less of the pressure before the through-flow bore 25 or the valve seat, in practice for example approximately half. This pressure differential however is substantially equalised thereafter and soon after the return of the hydraulic piston 7 is only comparatively low in general.

Following the opening of the backflow valve 21, the space 30 following the through-flow bore 25 up to the sub-surface 27 of the backflow valve piston 28 is included in the hydraulic space. Then, the hydraulic medium flows into the hydraulic tank 4 via a drain opening 31. The space 30 before and below is also referred to as valve space.

Figure 11:
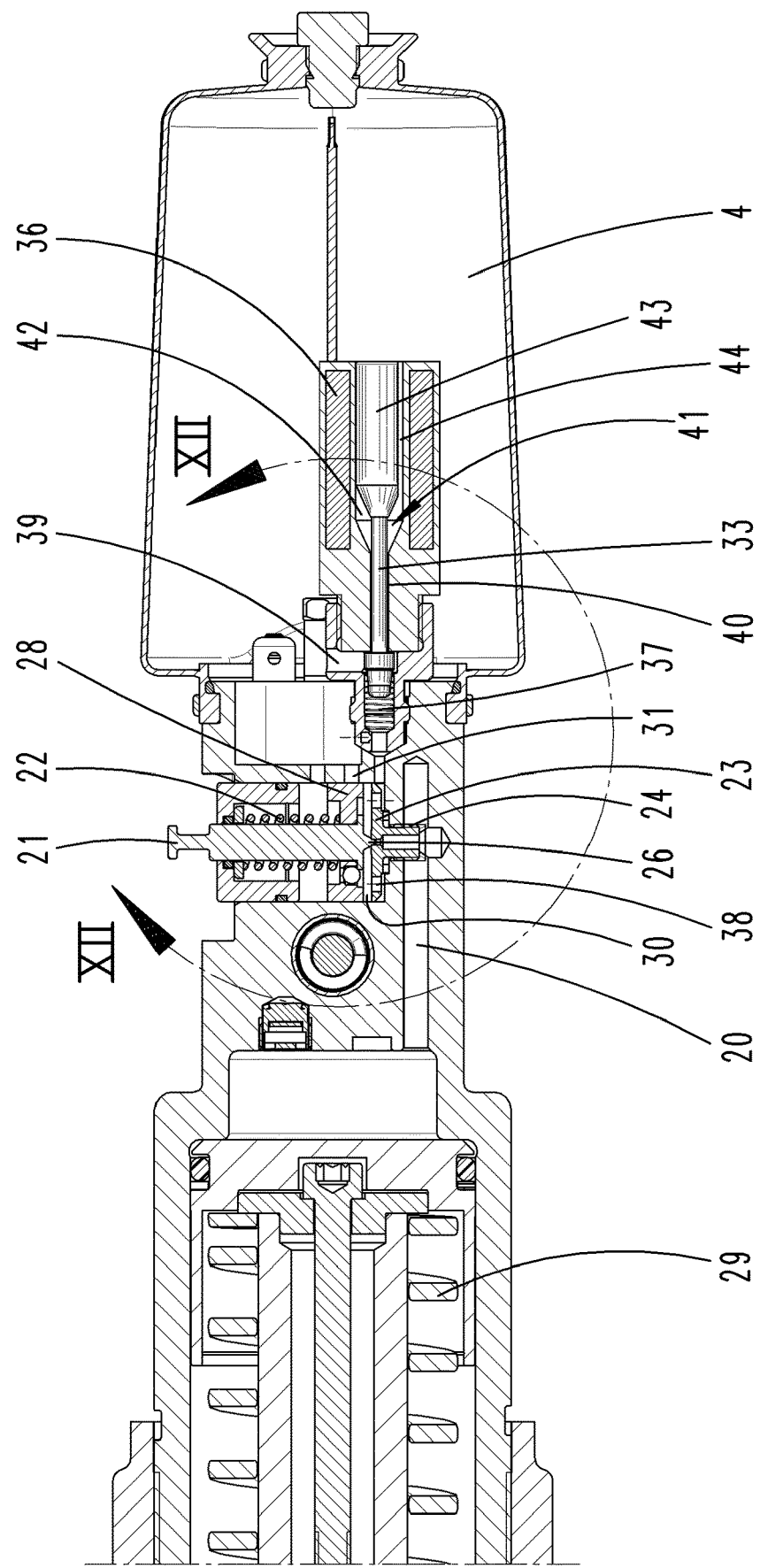
FIG. 11 a section through a hydraulically actuated manual crimping tool with certain configuration in terms of the backflow valve.
Figure 12:
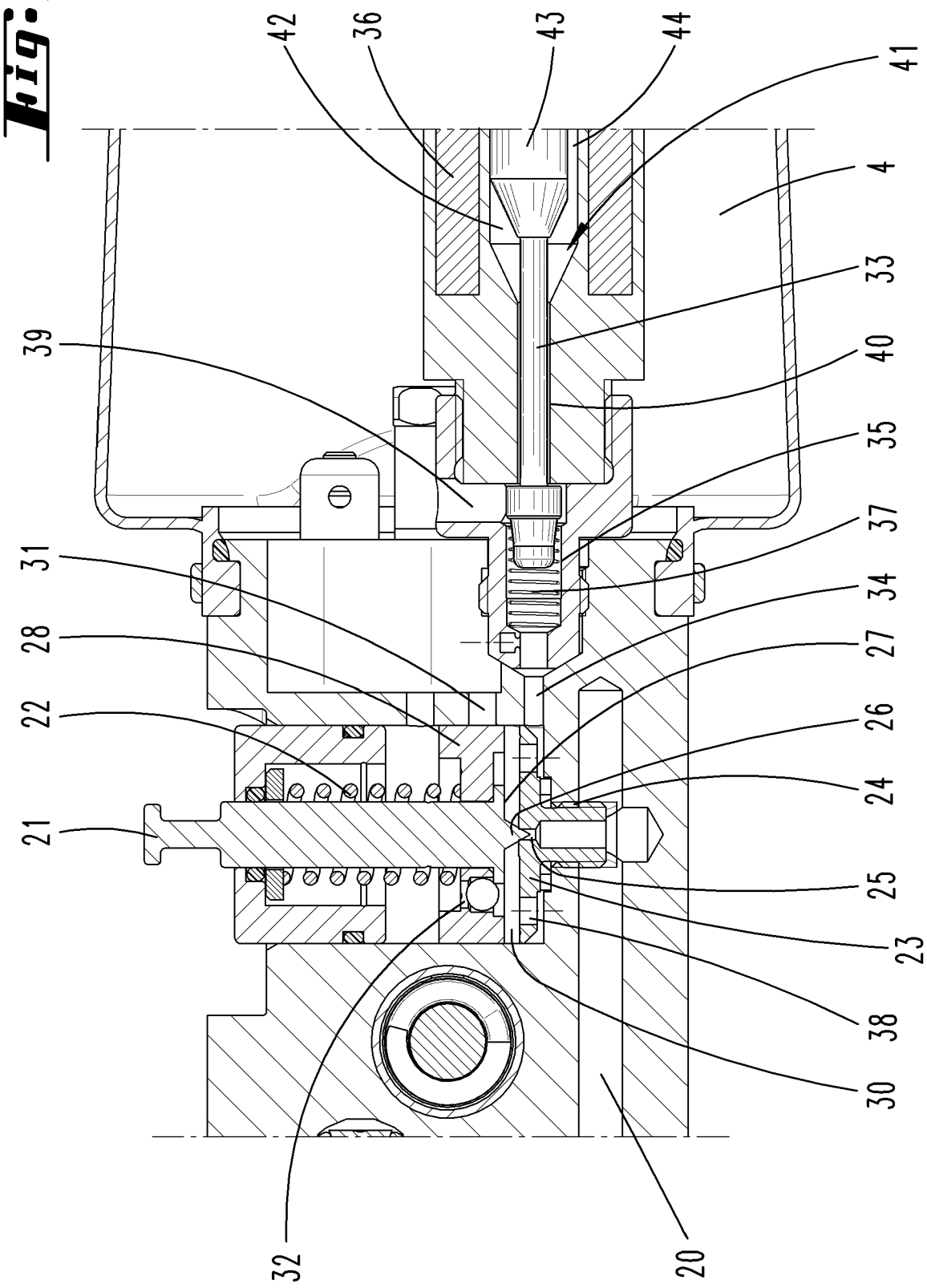
FIG. 12 the extracted enlargement of the region XII-XII in FIG. 11.

An axial bore 32 penetrating the sub-surface 27 and which is preferably non-return protected, makes possible, in the closure state of the backflow valve 21 according to the FIGS. 11 and 12, an inflow of hydraulic medium from the hydraulic tank 4 in particular for facilitating a return of a pressure booster piston 33.

Without further measure, the hydraulic or triggering pressure lifting the valve needle 26 out of the valve seat corresponds to an attainment of the general working force.

Through the termination of the certain working operation on attaining the characteristic change of the device value described here, the backflow valve 21 is moved into its opening position however without the hydraulic pressure necessary for the lifting of the backflow valve 21 being present at the hydraulic piston 4.

For this purpose, making reference to the exemplary embodiment described in the FIGS. 11 to 15, preferably assigned to the hydraulic space following the through-flow bore 25 in the outflow direction, a further line 34 which in the operating state is filled with hydraulic fluid is provided. This line 34 continues in a hydraulic medium cylinder 35 in which the already mentioned pressure booster piston 33 is preferably linearly displaceable. The line 34 could also be designed shorter than shown or be omitted as well.

By means of an electrically activatable setting magnet 96, a linear movement of the pressure booster piston 33 in the hydraulic medium cylinder 35 or in the line 34 is attainable. The movement of the pressure booster piston 33 brought about by activating the setting magnet 36 is brought preferably affected against the force of a return spring 37 acting on the pressure booster piston 33.

By way of the bores 38 provided for example in the screw-in part 23, preferably orientated in the movement direction of the backflow valve 21, the line 34 hydraulically forms a part of the space 30.

In the installed state, the screw-in part 23 does not lie directly against the facing housing wall so that hydraulic medium moved by the pressure booster piston 33 can easily flow out of the line 34 via the bore 38 into the part of the space 30 located in the outflow direction of the hydraulic medium after the valve seat.

During the course of performing a working operation, one or multiple device values, such as for example the pressure in the hydraulic medium or the amount of the motor current of the electric motor are now detected and evaluated with regard to the mentioned characteristic change.

On attaining the characteristic change predetermined by a comparison value, a corresponding signal is generated in the control which leads to an activation of the setting magnet 36.

Figure 15:
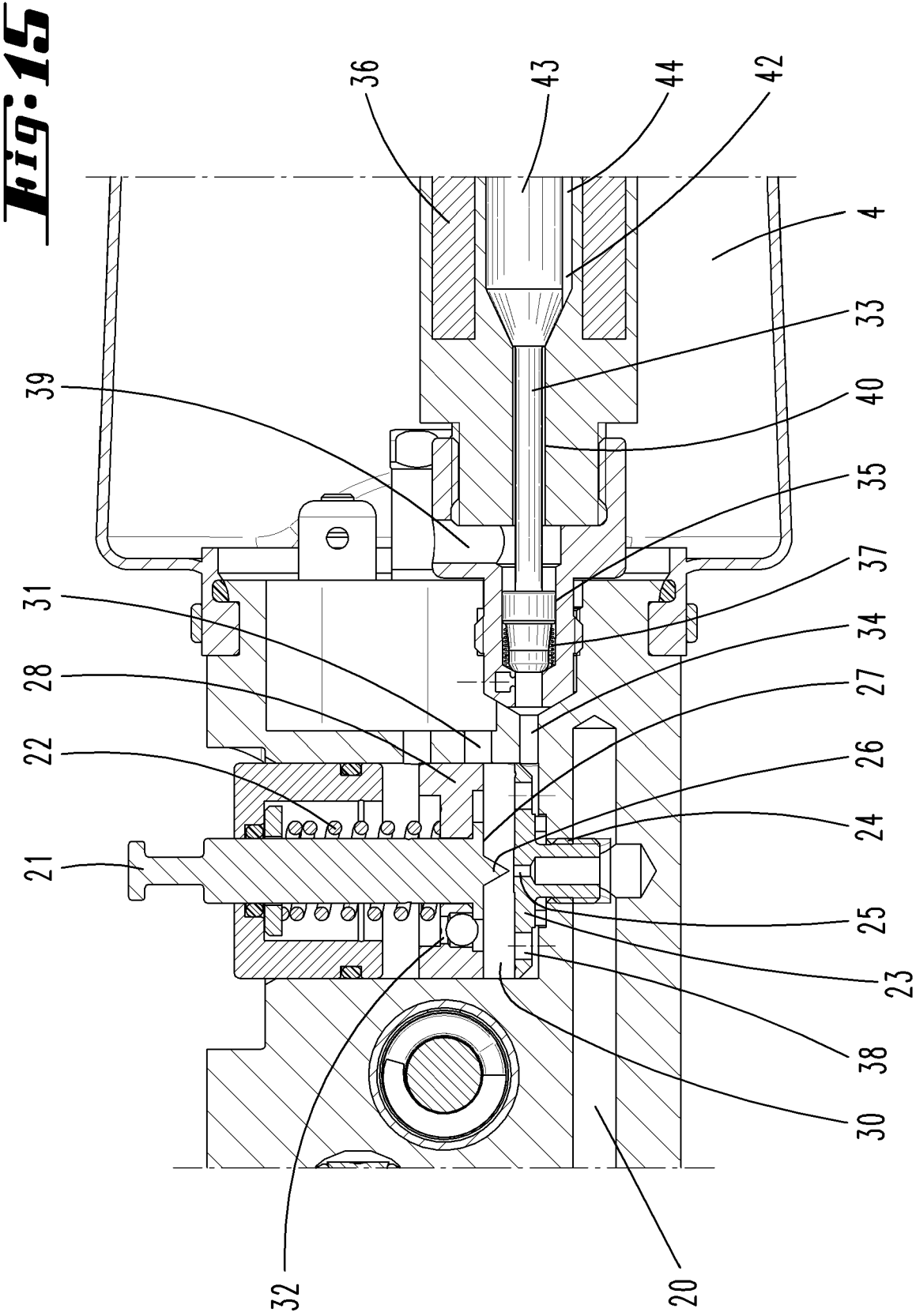

As a consequent of the activation of the setting magnet 36, the pressure booster piston 33 suddenly moves also against the force of the preferentially provided return spring 37 into the feed position according to the representations in the FIGS. 14 and 15. By way of this, the pressure booster piston 33 moves in a very narrow interaction that is practically sealed in terms of circumference with the hydraulic medium cylinder 35 of the line 34. Hydraulic medium present in front of the pressure booster piston 33 is displaced in a movement direction of the pressure booster piston 33 in the direction of the backflow valve 21 and thereby, in the exemplary embodiment shown, into the space "after" the through-flow bore 25. Thus, based on the closed state of the backflow valve 21, it is displaced into the space which is formed by the sub-surface 27 and the assigned side of the screw-in part 23 as well as a part of the cylinder, in which the backflow valve 21 is received. This is the already mentioned space 30, the valve space. By way of this, this valve space is acted upon in the sense of a reduction in size. This results in a brief pressure rise in the space 30 for acting on the sub-surface 27 of the backflow valve 21. Because of the diameter area of the sub-surface 27 which is substantially enlarged compared with the cross-sectional area of the through-flow bore 25 in the valve seat as a consequence of the loading, the lifting of the backflow valve 21 through the building-up of a pressure of a few bar, for example 2 to 5 bar, is already attainable. This pressure is (initially) solely attained by the piston-like displacement of the pressure booster piston 33.

In particular with such a configuration in the case of a hydraulic crimping device, the described attainment of the characteristic change as a signal for terminating the certain working operation can be very favourably and quickly reacted to.

By way of this, the valve needle 26 is lifted from the valve seat so that the return of the hydraulic medium out of the hydraulic cylinder 6 back into the hydraulic tank 4 that can take place, wherein the backflow valve 21 can be held in the lifted position until the hydraulic piston 7 has reached the end position according to FIG. 11 and the opening holding pressure for the backflow valve 21 is thus undershot.

The pressure rise on the backflow valve 21 by the pressure booster 33 has an initialising kind of effect. Upon the lifting of the backflow valve 21 and accompanying connection of the space 30 to the drain opening 31 with simultaneous opening of the through-bore 25, the pressure that is present because of the returning of the hydraulic piston 7 acts on the backflow valve 21.

The electric activation of the setting magnet 36 can initially take place impulse-like so that following the complete advance stroke of the pressure booster piston 33 the same is almost suddenly located in the advanced position according to FIG. 14. During the regular course of a working cycle, i.e. when in particular no premature termination of the return of the movement part is desired, which can also be carried out in principle with the described configuration, the pressure booster piston 33 in this position also remains loaded so long.

By way of a quasi prematurely performed insulation of the activation of the setting magnet 36 before the complete return movement of the hydraulic piston, the pressure booster piston 33 can correspondingly prematurely move back into its starting position. The enlargement of the valve space 30 connected with this can ensure for such a pressure drop that by way of this a desired closing of the backflow valve 21 is achieved. By way of this, a starting position that is regularly adjusted or individually changed by keeping an actuation switch depressed can be realised for a further working operation.

With a return movement of the pressure booster piston 33, a flow path out of the hydraulic tank 4 into the valve space 30 preferably also opens simultaneously in order to supply the valve space 30 with the required hydraulic medium, which makes possible the mentioned return movement of the pressure booster piston 33. As soon as the backflow valve 21 is closed again, no hydraulic medium can flow into the space 30 via the valve seat any longer. This flow path can be provided by a non-return valve arranged in the valve piston and/or a connecting path out of the hydraulic tank 4 to the line 34. With a return movement of the pressure booster piston 33 a (further) drain path for hydraulic medium into the hydraulic tank 4 can also result initially via a line section 39, which is opened by the returning pressure booster piston 33. Furthermore, but also complementarily or alternatively via a mounting 40 for a piston shank 41 for the pressure booster piston 33. By way of this and the preferably following expanded space 42, in which an actuating piston 43 of the pressure booster piston 33 is located, hydraulic medium can directly drain into the hydraulic tank 4.

In the actuated state, see FIGS. 14 and 15, it is also important that a front surface of the actuating piston formed conically here lies directly against the associated wall. On the other hand, the actuating piston 43 to the rear of this does not fill out the expanded space 42 completely. As a consequence of a flat or the like on one of its sides, a free space 44 in the expanded space 42 also remains in the state according to FIG. 14 or FIG. 15 that is advanced upon actuation.

It can also be provided that an advanced movement of the hydraulic piston 4 into the working position is maintained only for as long as the user actuates the switch. In a configuration, a signal is generated on releasing the switch (also before an attaining of the certain working force), which leads to an activation of the setting magnet 36 and thus, via the pressure booster piston 33, to a pressure rise in the space 30. Accordingly, on releasing the switch, the backflow valve 21 is moved into the opening position which in this regard can also lead to an automatic return of the hydraulic piston into the end position. Notwithstanding this, the mentioned condition of the certain working operation on attaining the characteristic change in the device value can also be provided even with holding the switch continuously depressed.

The pressure booster piston 33 can be arranged transversely orientated to the backflow valve 21. The longitudinal axes of the pressure booster piston 33 and of the backflow valve 21 intersect one another preferably outside the extension regions. This promotes a desired compact design.

In addition it can be provided, as also shown with the exemplary embodiment, that the setting magnet 36 or the construction section in this regard are circulated about by the hydraulic medium by projecting into the hydraulic tank 4.

The above explanations serve for the explanation of the inventions encompassed altogether by the application, which in each case also independently further develop the prior art at least by the following feature combinations, namely:

All disclosed features are (by themselves but also combined with one another) substantial for the invention. The disclosure content of the associated/attached priority documents (copy of the pre-application) is herewith included in the disclosure of the application, also for the purpose of also including features of these documents in claims of the present application. The subclaims with features characterize independent inventive further developments of the prior art, in particular in order to make part applications based on these claims.

LIST OF REFERENCE NUMBERS

1 Hydraulic manual crimping device
2 Hand grip
3 Accumulator
4 Hydraulic tank
5 Pump
6 Hydraulic cylinder
7 Hydraulic piston
8 Return spring
9 Moveable crimping jaw
10 Fixed crimping jaw
11 Electric motor
12 Crimping chamber
13 Crimping blank
14 Data processing device
15 Sensor
16 Sensor
17 Switch
18 Cutting blank
19 Control device
20 Return line
21 Backflow valve
22 Pressure spring
23 Screw-in part
24 Thread
25 Through-flow bore
26 Valve needle
27 Sub-surface
28 Backflow valve piston
29 Spring
30 Valve space
31 Drain opening
32 Axial bore
33 Pressure booster piston
34 Line
35 Hydraulic medium cylinder
36 Setting magnet
37 Return spring
38 Bores
39 Line section
40 Mounting
41 Piston shank
42 Space
43 Actuating piston
A Point
B Point
H Step height
h Step height
$L_1$ Line
$L_1'$ Line
S Gradient
S' Gradient
$S_1$ Gradient
$S_1'$ Gradient
$S_2$ Gradient
$S_2'$ Gradient

The invention claimed is:

1. A method of operating a motor-actuated working device to perform a working operation on a blank, comprising:
actuating a pair of jaws under action of at least one of an electric motor and a hydraulically operated piston operated via a hydraulic medium to perform the working operation which comprises the pair of jaws applying force to the blank to perform one of crimping the blank, cutting the blank and stamping the blank;
monitoring for an occurrence of a characteristic change indicating an attainment of a first working force applied by the pair of jaws at completion of the working operation, the characteristic change being at least one of 1) a gradient of a pressure curve, 2) a rise of an individual pressure step of a pressure curve, and 3) a gradient of an average motor current, wherein the characteristic change results when the pair of jaws are abutting each other during crimping of the blank or when a rapid drop of the force applied by the pair of jaws occurs during cutting or stamping the blank;

monitoring for an occurrence of a second working force applied to the blank by the pair of jaws, wherein the second working force is higher than the first working force, and the second working force is a permitted maximum pressure value of the hydraulic medium of the motor-actuated working device; and triggering at least one of the following actions when the second working force has been monitored one time or plural times and when the characteristic change has not been monitored: (1) providing a notification to a user to inspect the motor-actuated working device and (2) switching-off of the motor-actuated working device to force the user to inspect the motor-actuated working device.

2. The method according to claim 1, wherein the switching-off the motor-actuated working device is carried out or takes place immediately when the characteristic change is indicated.

3. A motor-actuated working device to perform a working operation on a blank, comprising:

a pair of jaws actuatable under action of at least one of an electric motor and a hydraulically operated piston operated via a hydraulic medium to perform the working operation which comprises the pair of jaws applying force to the blank to perform one of crimping the blank, cutting the blank and stamping the blank, the motor-actuated working device being configured to:

monitor for an occurrence of a characteristic change indicating an attainment of a first working force applied to the blank by the pair of jaws at completion of the working operation, the characteristic change being at least one of 1) a gradient of a pressure curve, 2) a rise of an individual pressure step of a pressure curve, and 3) a gradient of an average motor current, wherein the characteristic change results when the pair of jaws are abutting each other during crimping of the blank or when a rapid drop of the force applied by the pair of jaws occurs during cutting or stamping the blank, monitor for an occurrence of a second working force applied to the blank by the pair of jaws, wherein the second working force is higher than the first working force, and the second working force is a permitted maximum pressure value of the hydraulic medium of the motor-actuated working device, and trigger at least one of the following actions when the second working force has been monitored one time or plural times and when the characteristic change has not been monitored: (1) providing a notification to a user to inspect the motor-actuated working device and (2) switching-off of the motor-actuated working device to force the user to inspect the motor-actuated working device.

4. The motor-actuated working device according to claim 3, wherein the switching-off of the motor-actuated working device is carried out immediately when the characteristic change is detected.

5. A motor-actuated working device to perform a working operation on a blank, comprising:

a pair of jaws actuatable under action of at least one of an electric motor and a hydraulically operated piston operated via a hydraulic medium to perform the working operation which comprises the pair of jaws applying force to the blank to perform one of crimping the blank, cutting the blank and stamping the blank, the motor-actuated working device being configured to:

sense pressures and determine pressure steps, monitor the pressure steps for an occurrence of a characteristic change indicating an attainment of a first working force applied to the blank by the pair of jaws at a stage of completion of the working operation, the characteristic change resulting when a pressure step is greater than a predetermined step height and results when the pair of jaws are abutting each other during crimping of the blank or when a rapid drop of the force applied by the pair of jaws occurs during cutting or stamping the blank, monitor pressure steps for an occurrence of a second working force applied to the blank by the pair of jaws, the second working force being higher than the first working force, and switching-off of the motor-actuated working device when the second working force is monitored one time or plural times and when the characteristic change has not been monitored to force a user to inspect the motor-actuated working device.

6. The motor-actuated working device according to claim 5, wherein the termination of the working operation is carried out immediately when the characteristic change is detected.

* * * * *